(12) United States Patent
Punaganti Venkata et al.

(10) Patent No.: US 7,454,461 B2
(45) Date of Patent: Nov. 18, 2008

(54) DATA PROCESSING INFORMATION FEEDER FRAMEWORK

(75) Inventors: Murali Krishna Punaganti Venkata, Vantaa (FI); Indrajit Chaudhuri, Espoo (FI)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 10/921,072

(22) Filed: Aug. 18, 2004

(65) Prior Publication Data
US 2006/0039368 A1 Feb. 23, 2006

(51) Int. Cl.
*G06F 15/16* (2006.01)

(52) U.S. Cl. ............. 709/203; 709/219; 709/226; 709/231; 709/232; 709/246; 709/248; 715/701; 715/733; 715/748; 715/760; 715/761; 715/864; 719/328

(58) Field of Classification Search .......... 709/203, 709/226, 231, 232, 219, 246, 248; 715/701, 715/733, 748, 760, 761, 864; 719/328
See application file for complete search history.

(56) References Cited

U.S. PATENT DOCUMENTS

| 6,021,433 | A * | 2/2000 | Payne et al. ............. 709/219 |
| 6,421,707 | B1 | 7/2002 | Miller et al. |
| 6,742,042 | B1 * | 5/2004 | Holden et al. ........... 709/230 |
| 7,035,914 | B1 * | 4/2006 | Payne et al. ............. 709/219 |
| 2002/0059457 | A1 * | 5/2002 | Ballard et al. ........... 709/246 |
| 2002/0100063 | A1 * | 7/2002 | Herigstad et al. ......... 725/141 |
| 2003/0140090 | A1 * | 7/2003 | Rezvani et al. .......... 709/203 |
| 2004/0078354 | A1 * | 4/2004 | Pass .......................... 707/1 |

FOREIGN PATENT DOCUMENTS

EP 0905943 A2 3/1999

OTHER PUBLICATIONS

U.S. Appl. No. 10/884,793, filed Jul. 1, 2004, Punaganti Venkata.
U.S. Appl. No. 10/388,190, filed Mar. 13, 2003, Lonnfors et al.
U.S. Appl. No. 10/394,591, filed Mar. 21, 2003, Immonen.

* cited by examiner

*Primary Examiner*—Michael Won
(74) *Attorney, Agent, or Firm*—Hollingsworth & Funk, LLC

(57) ABSTRACT

A framework is configured for publishing data from a data processing arrangement coupled to a network. Data objects are provided from one or more application programs of the data processing arrangement. An information feed of the data processing arrangement is defined. The information feed provides a collection of data objects having related information-types. The data objects of the application programs are associated with the information feed based on an information-type of the data objects. The data objects of the information feed available are made available via a network component of the data processing arrangement.

23 Claims, 5 Drawing Sheets

DATA PROCESSING INFORMATION FEEDER FRAMEWORK

FIELD OF THE INVENTION

This invention relates in general to communications devices, and more particularly to communications devices configured for providing information feeds via a network.

BACKGROUND OF THE INVENTION

Mobile communications devices such as cell phones are gaining wider acceptance. The increased popularity of cell phones is due, in part, to the capabilities being added to such devices. Far from being simple voice communications tools, modern cell phones and other mobile devices are increasingly capable of performing general purpose computing tasks. The combination of power and portability of such devices has resulted in the widespread adoption of personal digital communications.

One factor that is expected to increase the popularity of mobile devices is the development of third generation (3G) technologies. The "3G" designation refers to a collection of standards and technologies that can be used in the near future to enhance performance and increase data speed on cell phone networks. In particular, 3G is an International Telecommunication Union (ITU) specification for the third generation of mobile communications technology. A 3G cell phone would, in theory, be compatible with the 3G languages or standards which support enhanced data speeds.

The 3G infrastructure aims to provide packet-switched data to a handheld terminal with data bandwidth measured in hundreds of Kbits/sec. It is intended that 3G will work over wireless air interfaces such as Code Division Multiple Access (CDMA), Wideband CDMA (W-CDMA), and the Time Division Multiple Access (TDMA) based General Packet Radio Service (GPRS). The latter interface is included in the Enhanced Data for GSM, Environment (EDGE) air interface that has been developed specifically to meet the bandwidth needs of 3G cell phones.

Along with increased network bandwidth capability, 3G cell phones will also include increased processing power due to advances in processors and memory. This will provide improved data processing capabilities, thus allowing 3G cell phones to handle applications currently associated with traditional computers. These applications typically include Internet communication applications such as email and web browsing. Since the cell phones are highly portable, this only increases the usefulness of Internet applications.

The power and portability of 3G mobile communications devices will make such devices indispensable, both in and away from the user's homes. However, providing additional capabilities via mobile communications devices may require adapting the devices in ways that may not have been envisioned in the design of mobile communications architectures. For example, earlier communications devices had limited capabilities, and therefore typically dealt with a limited set of data formats optimized for particular terminal software, hardware, and networks. However, 3G devices may be called upon to run more sophisticated applications that deal with a wide variety of data formats. This may expose users to data compatibility problems.

The data paradigm with which most computer users are familiar with is an application data-format paradigm. In this paradigm, each data-format on the system is associated with one or more applications. A data-format generally includes the type and arrangement of bytes in an instantiation of the data type. For example, a BMP formatted bitmap file is arranged in a particular binary data format. An application that is associated with a BMP file typically has facilities for opening the file, determining the image size and color information by reading a binary header, then constructing a view of the image based on the data contained in the remainder of the file.

The application data-format paradigm of computing is familiar to most experienced computer users, although can be confusing for novices. When communicating content from one user to the other, the content is formed using a particular file format. For example, a user might send a word processing document to another user attached to an email. If the recipient of the email does not have an application that can read the document format, the attachment is of no use. Therefore, the usefulness of the document is proportional to how widely viewable the format of the document is.

Technologies such as the Internet and the World Wide Web have done much to ensure interoperability of data formats. In particular, the Web has popularized open standards such as the Hypertext Markup Language (HTML). HTML can be used for presenting text and graphics in a way that is compatible with diverse computing platforms. Other technologies, such as the Extensible Markup Language (XML), can potentially provide interoperability for almost any kind of data, and not just documents for browser display.

The advantages of HTML and XML are that that documents prepared in these formats can be consistently interpreted by a wide variety of programs. These documents are most commonly viewed on browsers, but can be viewed with other applications, such as email clients and word processors. The browser has freed users from having to worry about reading data formats. This allows the users to concentrate their efforts on the useful aspects of the Web, i.e., viewing its content.

Even though standardized markup languages are useful in presenting data, these formats are not always the first choice when creating content. Various specialized programs exist in which to import and manipulate photos, edit text, conduct Internet chat session, create vector graphics, or perform other content-creation tasks. These specialized programs are often favored by users due to ease of use, special features, familiarity, and other aspects of the programs. Presenting data for the Web typically involves importing content created in these specialized applications and arranging that content into Web-compatible documents. Whenever the original content is changed, the Web page must be updated to reflect changes in the original content.

The conversion of data between various formats can be tedious, time-consuming, and error prone. This is why many Web pages fail to be updated. The user may still be creating content, such as writing in a journal or taking digital pictures, but that newer content is less likely to be publicly available if the user does not expend the effort to update the Web page. The initial interest in creating the first Web page is often overcome by the tedium involved in continually updating the documents, and thus the page remains static.

What is needed, then, is a way of empowering users to publish content in a standard fashion without requiring tedious formatting and conversion of data. The capability is especially useful in mobile devices, where the user may be able to create original content spontaneously, but would find it unduly difficult to manually format and publish that content using that same device.

SUMMARY OF THE INVENTION

The present disclosure relates to a system, apparatus and method for providing information feeds from a data processing arrangement coupled to a network. In one embodiment, a method involves providing data objects from one or more application programs of the data processing arrangement. An information feed of the data processing arrangement is defined. The information feed provides a collection of data objects having related information-types. The data objects of the application programs are associated with the information feed based on an information-type of the data objects. The data objects of the information feed may be made available via a network component of the data processing arrangement.

In more particular embodiments of the invention, the network component may comprise a Hypertext Transport Protocol (HTTP) server and/or a Session Initiation Protocol (SIP) server. Associating the data objects with the information feed may further involve registering the data objects with the information feed via an application interface associated with the information feed.

The method may further involve formatting the data objects into a data format associated with the information feed. Formatting the data objects may involve converting a data-type of at least one of the data objects. In one configuration, the data objects may be formatted into a Hypertext Markup Language (HTML) document.

In one configuration, making the data objects of the information feed available via the network component of the data processing arrangement involves making the data objects available via a server component of the data processing arrangement. In another configuration, making the data objects of the information feed available via the network component of the data processing arrangement involves sending the data objects to a server arrangement via the network.

In another embodiment of the present invention, a processor-readable medium includes a program storage device configured with instructions for causing a processor of a data processing arrangement to perform the operations of: 1) providing data objects from one or more application programs of the data processing arrangement; 2) defining an information feed of the data processing arrangement, the information feed providing a collection of data objects having related information-types; 3) associating the data objects of the application programs with the information feed based on an information-type of the data objects; and 4) making the data objects of the information feed available via a network component of the data processing arrangement.

In another embodiment of the present invention, a system includes a network having a plurality of data consumers. A data processing arrangement is coupled to the network. The data processing arrangement includes 1) means for providing data objects from one or more application programs of the data processing arrangement; 2) means for defining an information feed of the data processing arrangement, the information feed providing a collection of data objects having related information-types; 3) means for associating the data objects of the application programs with the information feed based on an information-type of the data objects; and 4) means for making the data objects of the information feed available to the data consumers via a network component of the data processing arrangement.

In a more particular embodiment, the system includes an aggregator node coupled to the network. The aggregator node is configured to form an aggregated information feed by combining the information feed of data processing arrangement with information feeds received from other data processing arrangements coupled to the network. The data processing arrangement may also include means for formatting the data objects into a data format associated with the information feed.

In another embodiment of the present invention, an apparatus is configured for exchanging data with one or more data consumers via a network. The apparatus includes a processor and a network interface configured to exchange data via the network. A memory is coupled to the processor and the network interface. The memory includes one or more user applications configured to provide data objects; an information feeder module configured to receive the data objects from the user applications and form one or more information feeds based on the data objects, each information feed including a collection of data objects having related information-types; and a network interface module configured to make the information feeds available to the plurality of data consumers via the network interface.

In a more particular embodiment, the information feeder module includes an application program interface configured accept registration of data objects and information-types associated with the data objects. The information feeder module may be further configured to format the data objects into a data format associated with the information feed. The network interface may include a wireless network interface. The network module may be configured to make the information feeds available via a Hypertext Transport Protocol (HTTP) server and/or a Session Initiation Protocol (SIP) server.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a framework for providing specialized information feeds to and from mobile devices. The information feeds may be select data for publication based on information-type. Generally, information-type refers to a user's classification of the data, rather than a data format classification. Therefore, an information-type might include designations such as "sports" and "travel," as distinguished from content-types typically dealt with by applications, such as "images" and "text."

The data published in the information feeds can be advertised and provided by a server component of a mobile device. The mobile device may include a common application program interface (API) that provides a way for applications to publish application data via particular information feeds. The information feeds may be set up to run automatically, or the user may have a mechanism to selectively activate feeds and/or activate particular pieces of data within active feeds.

The concepts described herein regarding an information feeder framework are applicable to any type of communication systems, devices, and networks. In order to facilitate an understanding of the invention, the present invention is described in the context of mobile devices in a wireless networking environment. It will be appreciated, however, that the invention may be applicable in any system or application where sending data feeds from data processing devices is desired.

The information feeder framework provides users the ability to form specialized information feeds that provide a coherent picture of content based on the interests of the user. The user may use a specialized application program to create content that reflects the user's tastes and interests. The applications are enabled to communicate with other software components to automatically create an information feed using the application content. The information feed provides the data to external users, preferably in a standardized and application-independent format. The format used in any particular information feed may be determined based on the inputs and preferences of the user. This scenario is illustrated in FIG. 1, which shows a framework 100 for specialized information feeds according to embodiments of the present invention.

Figure 1:
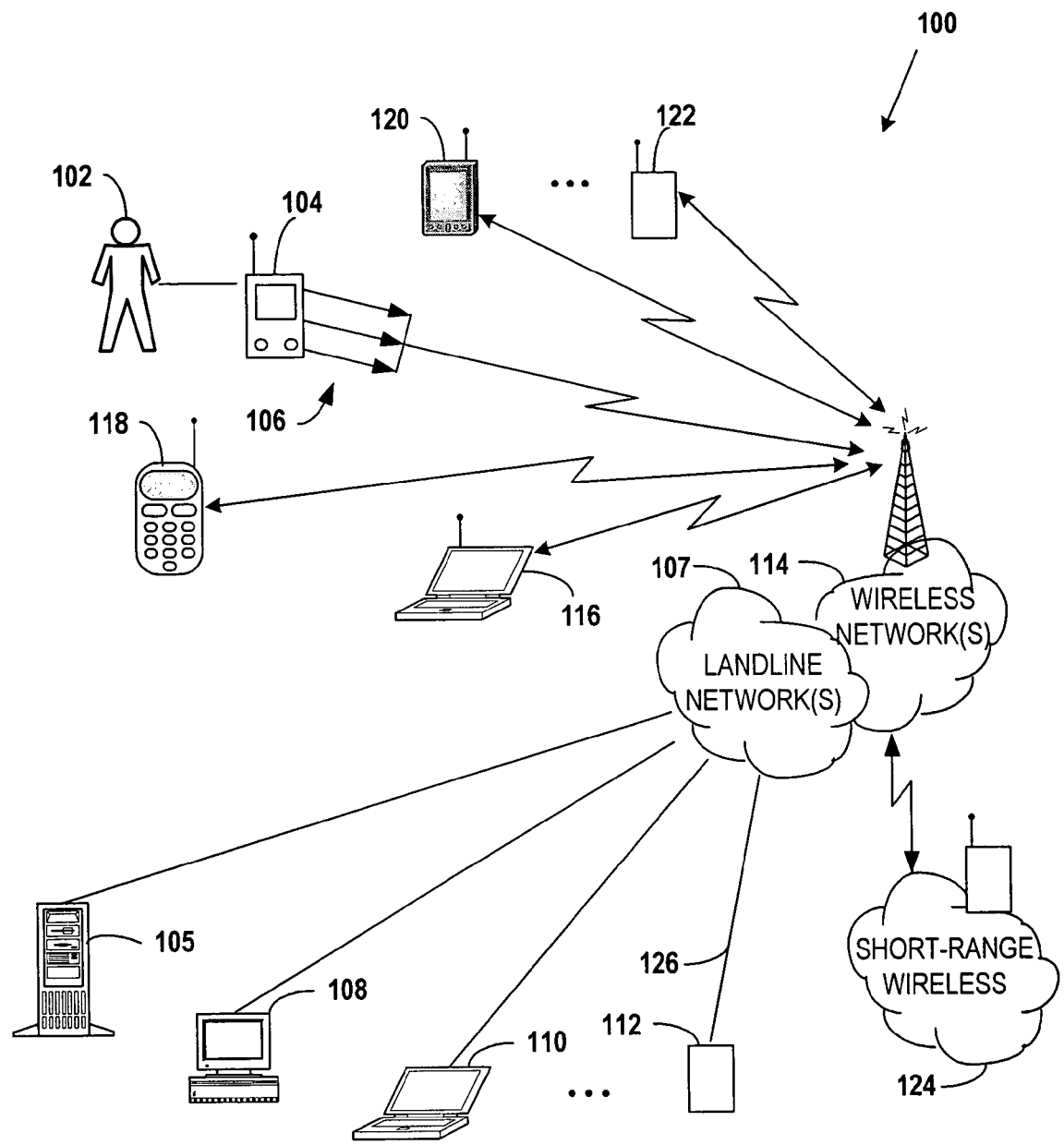
FIG. 1 illustrates an information feeder framework according to embodiments of the present invention.

In FIG. 1, an end user 102 interacts with a data processing arrangement such as a mobile communications device 104. For purposes of illustration, the concepts will be described in terms of the user 102 interacting with a mobile communications device 104, although it will be appreciated that the information feeder framework 100 may be utilized with any type or manner of data processing arrangement.

In accordance with the desires of the user 102, the mobile communications device 104 is configured to produce one or more information feeds 106. Each information feed 106 includes a collection or sequence of externally accessible data objects with related information types. The arrangement and format of the data objects may be defined by one or more user-selectable parameters. Once the user 102 has configured the information feeds 106, the data may be made available to other elements of the framework 100. The information feeds 106 may be "pushed" out to other elements of the framework 100. In other configurations, the information feeds 106 may be retrieved from a server process running on the mobile communications device 104. The feeds 106 may also be retrieved from a network element acting as a proxy for the device 104.

The data within the information feeds 106 may be made available immediately after creation without any further action on behalf of the user 102. Of course, some user interaction may be desirable to restrict access to what is contained in the information feeds 106. Limiting the information feeds 106 may be accomplished, for example, by requiring user confirmation before a piece of data is added to an information feed 106. Also, the user may place restrictions on when an information feed 106 is made available or pushed to other elements of the framework 100.

As previously described, the information feeds 106 may be implemented as a collection of data that is made available by the communications device 104. The data contained in the information feeds 106 may be created by one or more applications running on the device 104. For example, the device 104 may include a digital camera and an associated application for managing photos taken via the digital camera. The application may be configured to publish selected photos via one or more of the information feeds 106.

The information feeds 106 may be targeted for use by various network elements of the framework 100. These network elements can view, download, and aggregate data in the information feeds 106 for use by others. Network elements that can access the information feeds 106 include servers 105 and peers of the communication device 104 (e.g. device 122). It will be appreciated that the information feeds 106 may act two-way communications channels, such that the user 102 may also receive data via the feeds 106. The incoming data may originate from a server 105 or peers 122 as appropriate.

The information feeds 106 may be communicated between target devices in any number of known manners. These manners include via a landline network(s) 107, which may include a Global Area Network (GAN) such as the Internet, one or more Wide Area Networks (WAN), Local Area Networks (LAN), and the like. Any computing device or other electronic device that supports network data exchanges may be the target system that utilizes the present invention, such as servers 105, desktop computers 108 or workstations, laptop or other portable computers 110, or any other similar computing device capable of communicating via the network 107, as represented by generic device 112.

The information feeds 106 may be communicated via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device can communicate using information feeds 106, such as laptop or other portable computers 116, mobile phones 118, Personal Digital Assistants (PDA) 120, or any other similar computing device capable of communicating via the wireless network 114, as represented by generic device 122.

The information feeds 106 may be transferred between devices using short-range wireless technologies 124, such as Bluetooth, Wireless Local Area Network (WLAN), infrared (IR), etc. The information feeds 106 can also be distributed using direct-wired connections, such as depicted by connection path 126 to generic wired device 112. The present invention is applicable regardless of the manner in which data is provided or distributed between the target devices.

Figure 2:
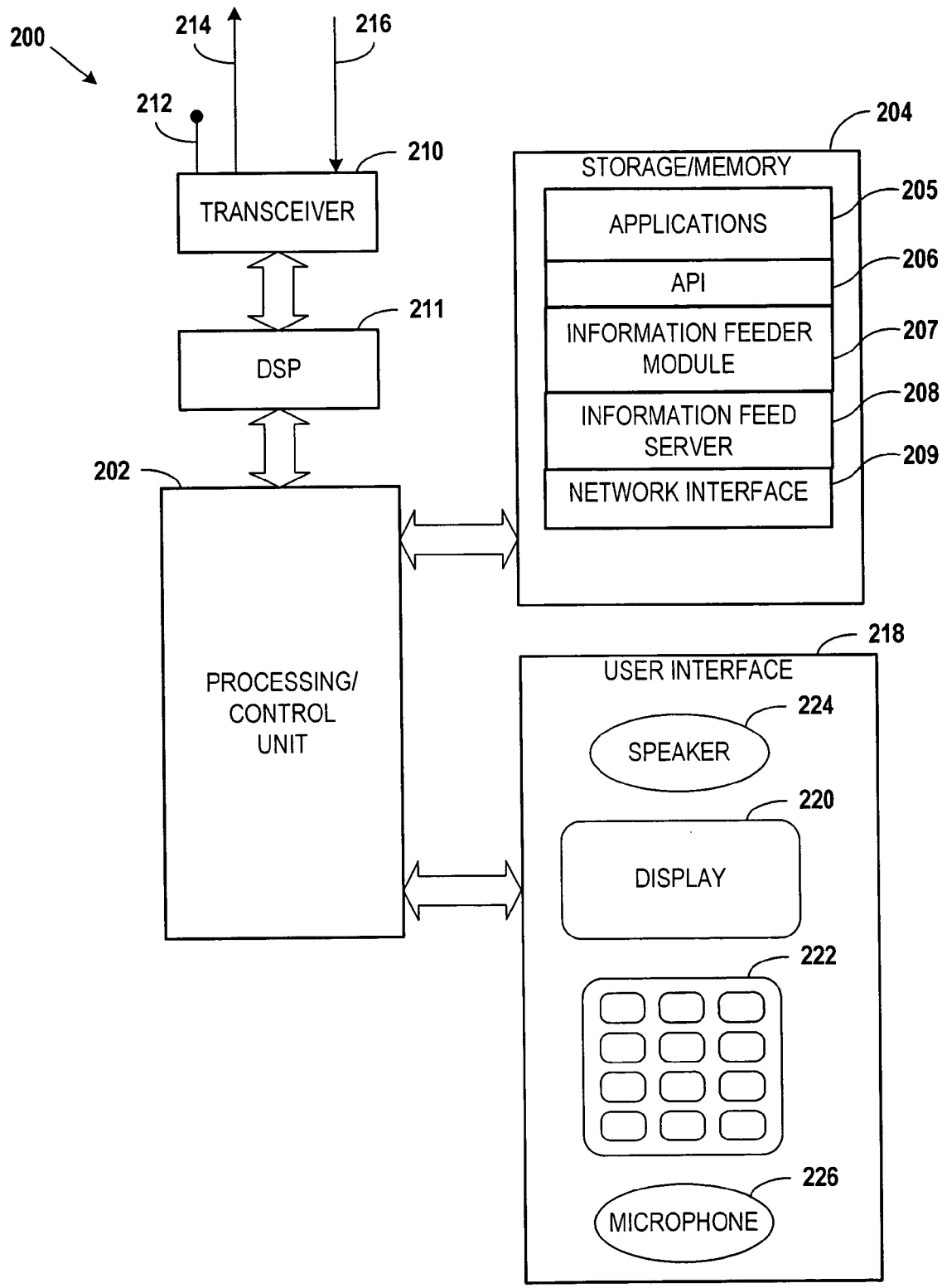
FIG. 2 illustrates a mobile device adapted for use with an information feeder network according to embodiments of the present invention.

An example of a target device that provides information feeds according to embodiments of the present invention is illustrated in FIG. 2 as the mobile computing arrangement 200. Those skilled in the art will appreciate that the exemplary mobile computing arrangement 200 is merely representative of general functions that may be associated with such mobile devices, and also that landline computing systems similarly include computing circuitry to perform such operations.

The mobile computing arrangement 200 is suitable for providing one or more information feeds in accordance with embodiments of the present invention. The representative mobile computing arrangement 200 includes a processing/control unit 202, such as a microprocessor, reduced instruction set computer (RISC), or other central processing module. The processing unit 202 need not be a single device, and may include one or more processors. For example, the processing unit 202 may include a master processor and associated slave processors coupled to communicate with the master processor.

The processing unit 202 controls the basic functions of the mobile computing arrangement 200. Those functions associated may be included as instructions stored in a program storage/memory 204. The program storage 204 may include one or more of read-only memory (ROM), flash ROM, programmable and/or erasable ROM, random access memory (RAM), subscriber interface module (SIM), wireless interface module (WIM), smart card, or other removable memory device.

In one embodiment of the invention, the program modules associated with the storage/memory 204 are stored in non-volatile electrically-erasable, programmable ROM (EEPROM), flash ROM, etc. so that the information is not lost upon power down of the mobile computing arrangement 200. The relevant software for carrying out conventional mobile terminal operations and operations in accordance with the present invention may also be transmitted to the mobile computing arrangement 200 via data signals, such as being downloaded electronically via one or more networks, such as the Internet and an intermediate wireless network(s).

In one arrangement, the program storage/memory 204 includes software modules such as end-user applications 205, an information feed processing module 207, an information feed server 208, and a network interface module 209. The applications 205 are generally user-accessible programs that assist in creating publishable content. The applications 205 may interface with various user interface devices 218 of the computing arrangement 200 for receiving user input. Communications between the applications 205 and other modules 207, 208, 209, may occur via any combination of function calls, inter-process communications, and other data transfer methods known in the art.

The applications 205 communicate with the information feeder module 207 for purposes of providing content for one or more information feeds. This communication may involve sending data objects (or references to data objects) to the feeder module 207. Data objects may include any combination of text, images, binary data, files, etc. The data objects may exist as discrete objects (e.g., files and/or objects in memory) as well as including streaming data. The communication may involve transferring the data object, communicating a reference to the object, and/or communicating changes regarding an existing object.

The applications 205 typically communicate via an application program interface (API) 206 provided in conjunction with the information feeder module 207. The API 206 allows the applications 205 to inform the information feeder module 207 about newly created content (or modified content) and associate that content with various information feeds.

The information feeder module 207 provides information feeds to external entities via the information feed server 208. The information feed server 208 may provide functionality such as accepting incoming connections and fulfilling information feed requests in response to those connections. The information feed server 208 may also be arranged to actively send information feeds out to predetermined network destinations, either immediately upon creation of new content or on a predetermined schedule.

The information feed server 208 communicates with external entities via the network interface 209. The network interface 209 may include software components (e.g., drivers, protocol stacks) that allow data transfers over wired or wireless network devices of the mobile computing arrangement 200. In particular, the network interface 209 may interface with wireless data communications circuitry. This circuitry may include a digital signal processor (DSP) 211 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 210, generally coupled to an antenna 212, transmits the outgoing radio signals 214 and receives the incoming radio signals 216 associated with the wireless device 200.

The processor 202 may also be coupled to user-interface 218 elements associated with the mobile terminal. The user-interface 218 of the mobile terminal may include, for example, a display 220 such as a liquid crystal display, a keypad 222, speaker 224, and microphone 226. These and other user-interface components are coupled to the processor 202 as is known in the art. Other user-interface mechanisms may be employed, such as voice commands, switches, touch pad/screen, graphical user interface using a pointing device, trackball, joystick, or any other user interface mechanism.

The mobile computing arrangement 200 of FIG. 2 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 3:
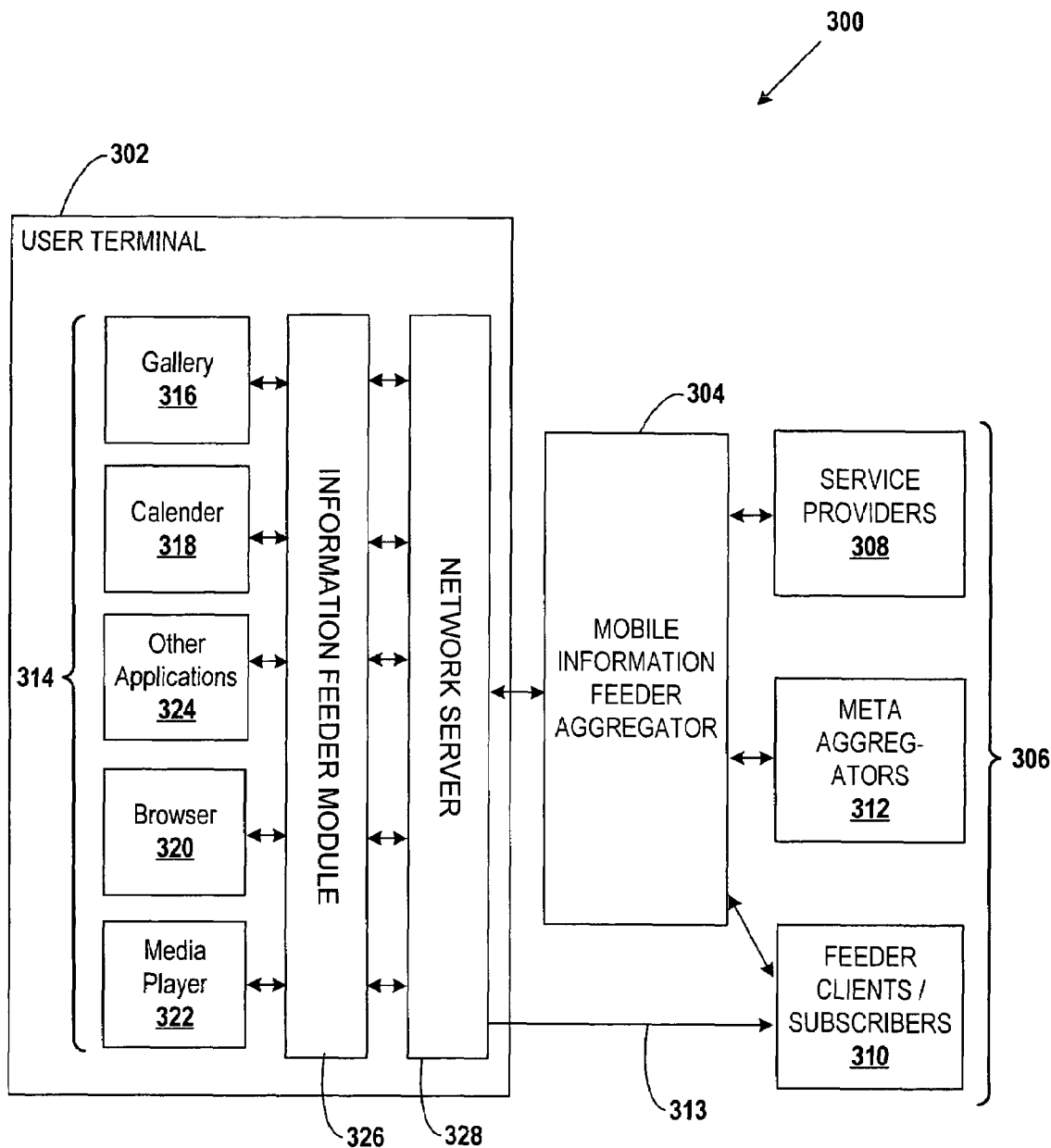
FIG. 3 illustrates a software architecture for an information feeder system according to embodiments of the present invention.

The information feeder module 207 shown in FIG. 2 is one software component of a network-based information feeder framework designed to allow users to provide externally accessible data in a common format. FIG. 3 shows, in greater detail, software components of an information feeder framework 300 according to embodiments of the present invention. The framework 300 includes a user terminal 302, a mobile information feeder/aggregator 304 and various information feed data receivers 306. The user terminal 302 acts as a data source for information feeds. This generally means the user terminal 302 can be used for generating content for information feeds, although the user terminal 302 may also act as a receiver of incoming information feed data as well. The user terminal 302 may act as the sole provider of data for an information feed, although some cases data originating from the terminal 302 will be sent through a feeder/aggregator 304 to be combined with data from related feeds.

The feeder/aggregator 304 acts as a point for aggregating, categorizing, and correlating information feed data, as well as for managing data-connection aspects of the client information feeds. For example, the feeder/aggregator 304 could combine different feeds having the same information types into a single feed of that information-type. The information received by the feeder/aggregator 304 may be used by a variety of network elements 306, including specialized service providers 308, other feeder clients 310, and meta-aggregators 312 (e.g., other feeder/aggregators 304). Because the information received at the feeder/aggregator 304 may come from a variety of sources (e.g., client 310), mechanisms may be employed to identify and disregard redundant or irrelevant data. Peer elements such as the feeder clients 310 may also access the information feeds of the user terminal 302 directly, as indicated by the path 313.

The data provided by the user terminal 302 may be single-part or multi-part content. Information feed data sent from the user terminal 302 to the feeder/aggregator 304 typically originates from one or more applications 314 of the user terminal 302. The illustrated applications 314 include a media gallery 316, a calendar application 318, a browser 320, a media player 322, and any other application 324 known in the art for creating and/or viewing digital content. The applications 314 can be used for both viewing content from information feeds, as well as providing data to information feeds. The applications 314 interact with information feeds via an information feeder module 326.

The information feeder module 326 provides a common point for identifying and processing data to be used in information feeds. The information feed module may handle tasks such as accepting data from the applications 314, maintaining a registry that links various application data to specific feeds, formatting the data to be compatible with the feed, and making information feed data available via a network server module 328. The network server module 328 provides network communications functionality, such as listening for connections, listening for incoming data, sending outgoing data, handling lost/interrupted connections, and the like.

The information feeder module 326 works in concert with the applications 314 to automatically and transparently create information feeds from the application data. For example, the calendar application 318 may have a menu option called "Publish Schedule" which then brings up a dialog listing current information feeds defined on the user terminal 302. The user may choose one of these feeds, or create a new feed. The selected feed may have an information-type such as "schedule," "availability," "meetings," etc. The user may also provide other application specific parameters, such as a date range and expiration time of published schedule items. Once the publish parameters are set, the calendar application 318 communicates with the information feeder module 326 to set up the information feed. This communication may include defining the data types provided by the application 318, update policies, access policies, information feed format, content identifier(s) related to the data, identifiers for the feed, identifiers for application data objects, etc.

Once the information feed is established, the calendar application 318 and information feeder module 326 can interact to provide an externally accessible "picture" of the user's schedule without further interaction on the part of the user. So, for example, if the user deletes or adds an item via the calendar application 318, this change is communicated to the information feeder module 326 for processing. Depending on the form of the information feed, these changes may be communicated to external entities immediately, or used to update a local state, which can be accessed by external entities at a later time.

An example of the first type of information feed is where the network server module 328 sends out scheduled changes to network entities (e.g., a commonly accessible server) by a mechanism such as the Internet Message Access Protocol (IMAP). If the latter type of information feed is used (e.g., one that updates a local state), the changes may be used to update a local HTML document. This HTML document may be made available to the network by the network server module 328 using an HTTP server process. It will be appreciated that the information feed module 326 and network server module 328 may use any combination of local or remote updates, as well using as custom protocols and/or data formats that are particularly tailored for information feeds.

Figure 4:
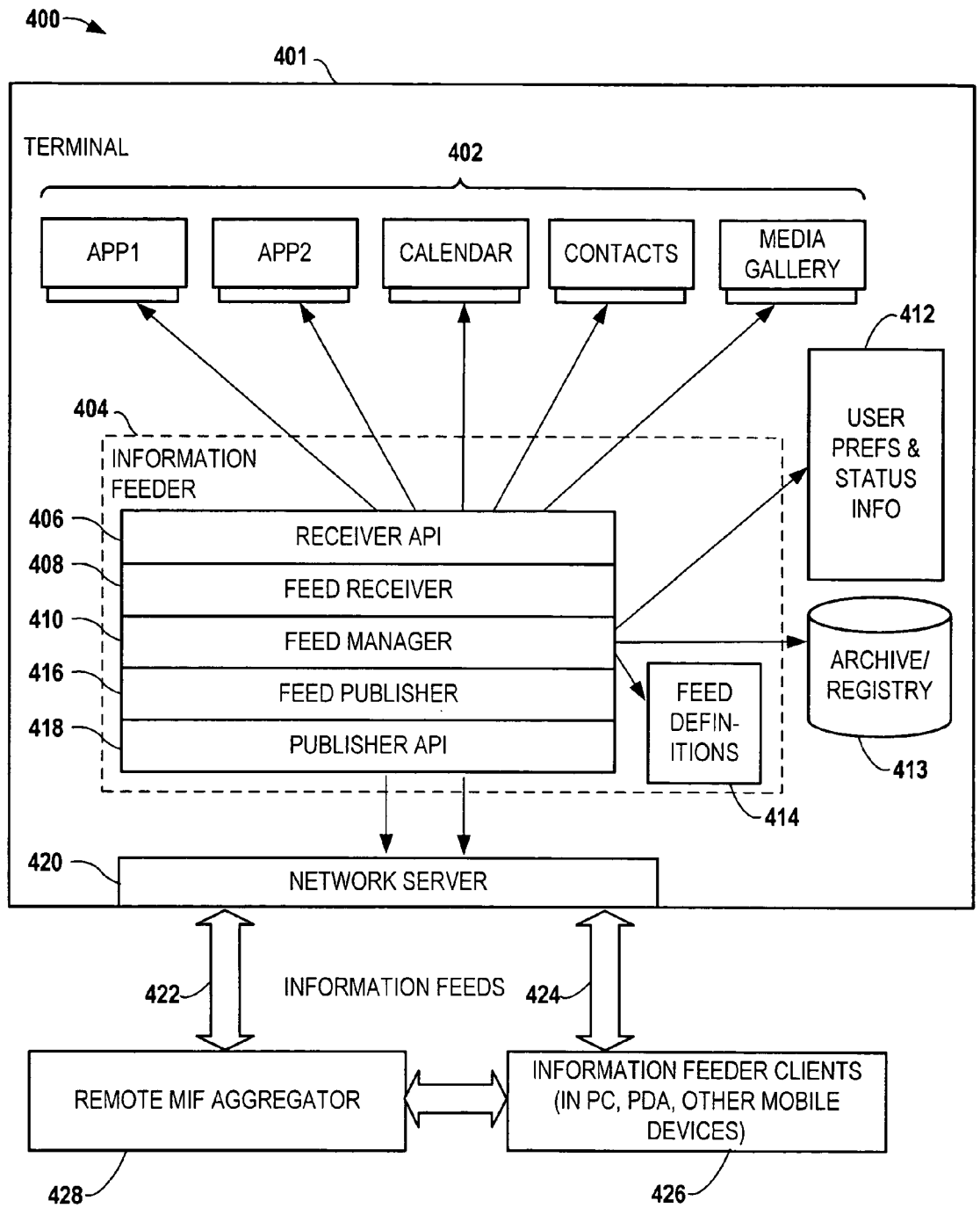
FIG. 4 illustrates a software architecture for an information feeder client according to embodiments of the present invention.

A more detailed view of a user terminal architecture 400 according to embodiments of the present invention is shown in FIG. 4. The architecture 400 may be included in any data processing apparatus known in the art and may be implemented using any combination of hardware and software. In this example, the architecture 400 is implemented on a terminal 401, such as a portable data processing device. The terminal 401 includes user applications 402. The user applications 402 may include any manner of software accessible by the user. Generally, the applications are GUI or command line programs requiring user input, although the applications 402 may also include background processes that do not require user intervention.

The applications 402 are configured to communicate with an information feeder module 404. The information feeder module 404 may include one or more running processes, therefore the applications 402 may communicate with the module 404 via IPC mechanisms. The IPC communications may use any combination of techniques known in the art, such as sockets, pipes, kernel or operating system messages, middleware IPC software (e.g., Java RMI, CORBA), and the like. Generally, the IPC mechanisms (if required) will be incorporated into an application program interface (API) 406 of the information feeder module 404.

The API 406 is a standardized interface that allows applications 402 to access the functionality of the information feeder module 404. The API 406 typically provides standard function calls that allow the applications to register data types, send data, receive data, communicate user preferences, access information feed configuration GUIs, etc. Data that is sent to the API 406 is processed at the feed receiver 408. The feed receiver 408 typically partitions information received from the applications 402 based on content and format of the application data. The feed receiver 408 may also receive meta-data associated with the content, such as descriptive labels, destination feeds, information-type, content-type, date/time, etc. Other data categories received at the feed receiver 408 includes control data. Control data may be used for feed-specific tasks such as creating new information feeds and modifying parameters of existing information feeds.

The feed receiver 408 passes content and control data to a feed manager 410. The feed manager 410 controls many operations of the information feeder module 404. For example, the feed manager may update user preferences and status data 412 with control data received from the applications 402. The user preferences and status data 412 may contain configuration data such as access lists, security settings, bandwidth limitations, user presence and identity data, etc. The user preferences and status data 412 may be configurable separately for each information feed, or be applied uniformly to all active feeds.

Besides dealing with user preferences and status 412, the feed manager 410 may also control time-dependent functions of the information feeds. These time-dependent functions may include initiating scheduled events (e.g., uploads, downloads) and detecting stale data. The feed manager 410 may maintain an archive/registry 413 with feed data and/or references to feed data. The archive/registry 413 may also include link data that ties application data to various feeds. Finally, the feed manager 410 may maintain feed definitions 414, which typically involves determining content and state of the information feeds.

The content received from the applications 402 is formatted by the feed publisher 416. The feed publisher 416 takes data in the application format and presents the data in a format appropriate for the selected information feed. Different information feeds may have different formatting requirements. Therefore, the feed publisher 416 may reference the feed definitions 414 to determine the correct formatting parameters. For example, one feed may be formatted as HTML, while another feed may be formatted as a multimedia stream.

The feed publisher 416 interacts with the publisher API 418 in order to present the data to network entities via a network server module 420. As with the feed publisher 416, the publisher API 418 may require access to the feed definitions 414 in order to use the correct protocols at the network server module 420. With the example presented above, the HTML feed may be presented using HTTP, while the multimedia stream may be presented using the real-time streaming protocol (RTSP) and session initiation protocol (SIP).

Although the server module 420 is shown as a single component, it will be appreciated that many separate system components may be involved in providing the functionality of the network server 420. The availability of various services may be system dependent, and the publisher API 418 would likely have mechanisms for determining availability of these services. Also, the network server module 420 may also include client-side network capabilities as well, such as initiating a connection with a remote network server arrangement.

Generally, the network server 420 presents one or more information feeds 422, 424 over one or more networks accessible by the terminal 401. The information feeds 422, 424 may be continuous or intermittent in nature. A continuous feed may use an established connection to asynchronously send data. Alternatively, an intermittent feed could be established such that it is accessed at a set time or in response to some event. The times and/or events may be based on a schedule or at the request of the user. The publisher API 418 and network server 420 will take such factors into account as part of initiating, maintaining, and closing the information feeds 422, 424.

The information feeds 422, 424 may be received by any combination of end users 426 or intermediate aggregation elements 428. It will be appreciated that the terminal 401 may maintain multiple information feeds 422, 424 simultaneously. The information feeds 422, 424 may be used for both sending out data as well as receiving data.

Figure 5:
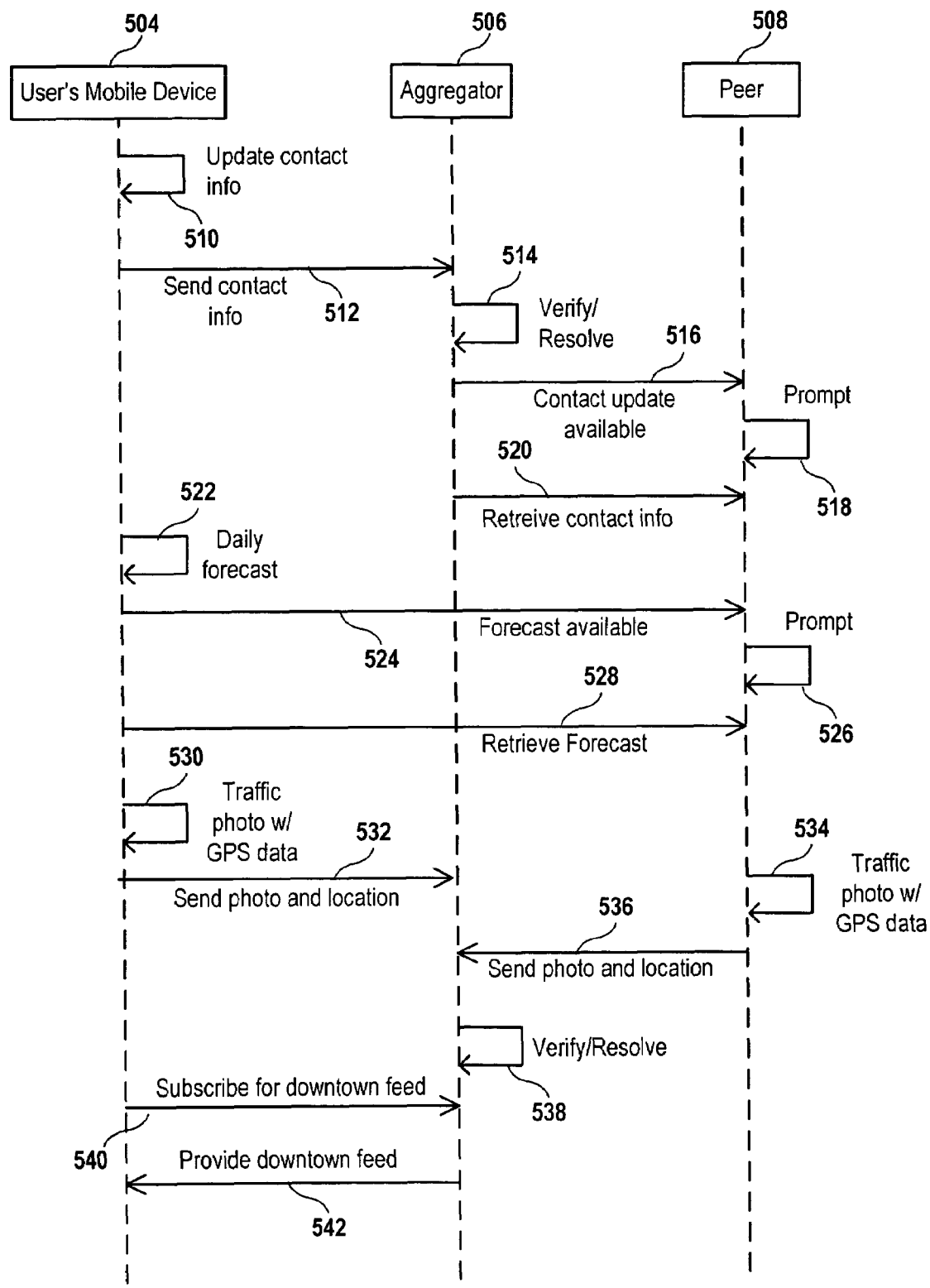
FIG. 5 illustrates information feeder data exchange sequences according to embodiments of the present invention.

The use of information feeds allows a user to publish narrowly tailored content on a regular basis with a minimum of user interaction. An example of usage scenarios according to embodiments of the present invention is illustrated in FIG. 5. In this scenario, a user has a mobile device 504 that is configured to send information feeds. The mobile device 504 is in network communication with an aggregator 506, which may include one or more servers arranged to receive, categorize, resolve, and send out content. The aggregator 506 may also include the needed functionality to manage various aspects of information feeds, including starting/stopping of sessions, feed registration, authorization, security, presence, etc. The aggregator 506 and/or the mobile device 504 may also be coupled to a peer 508 that receives content contained in the information feeds.

In the first part of this scenario, it is assumed that the user has a an application used for entering contact data such as name, phone number, email address, current location, etc. The contact application has registered with an information feed (e.g., "group_X_contact_data") that provides contact data for a group of individuals. The user updates (510) his or her contact data on the terminal application. Because the contact data is linked to an information feed, the terminal 504 may automatically send (512) the contact information over the appropriate information feed. In this example, the update is sent (512) to an aggregator 506, which first verifies and resolves (514) the update. In this case, it is unlikely that another user would be providing an identical update to this user's contact data. In other situations, however, it may be that duplicate data is sent to the aggregator 506, in which case the aggregator 506 would resolve duplicates to reduce storage and bandwidth requirements. After resolving and verifying (514) the data, the aggregator 506 determines that the user of the peer terminal 508 has subscribed to this particular information feed. The aggregator 506 then notifies (516) the peer terminal 508 regarding the update.

Although the peer terminal 508 may automatically receive update contact data from information feeds, in this example the peer terminal 508 first prompts (518) the user before accepting the data. Assuming the user accepts, the data can then be retrieved (520). The data received at the peer terminal 508 may be automatically routed to an application program similar to that used to create/update the data on the originating device 504. Alternatively, the user of the peer terminal 508 may have an alternate application registered to view this type of information feed, such as a browser or word processor.

In another example, the user of the mobile device 504 may also provide some service such as writing a daily forecast (522) to registered users. This forecast may be horoscopes, stock predictions, weather, etc. In this example, the information feed is in a peer-to-peer arrangement, such that the user's device 504 informs (524) the peer device 508 directly. As before, the user is prompted (526) and upon acceptance, the forecast is sent (528) to the peer device 508. This retrieval may be either a "push" from the originator's device 504 or "pulled" from the receiving device 508.

In a final example, it will be assumed that a traffic management system utilizes drivers throughout the city who have camera phones. At various points along a driver's commute, they may snap a photo (530) of current traffic conditions. This photo may be combined with location data, such as data obtained from a global positioning satellite (GPS) unit or from triangulation of the phone signal. The user may also add specialized data to the photo, such as a comment formed by speaking into the phone. Such comments may include well known terms describing how fast the traffic is moving or describing road conditions. The photo and associated data is sent (532) via the appropriate information feed to the aggregator 506. The peer terminal 508 may perform similar steps (534, 536) at a different location.

The aggregator 506 may continually verify and resolve (538) images and associated data from incoming information feeds. This may involve resolving GPS data into a road location, translating comments into traffic codes using voice recognition software, removing dated/illegible images, etc. At some point, the user may want to subscribe (540) to the aggregated feed for a particular destination, such as downtown. The feed may be provided (542) to the user with data such as recent photos and traffic flow maps. This data provided (542) in this information feed may have originated from any combination of peer terminals (504, 508) and other service providers, such as governmental highway departments.

Hardware, firmware, software or a combination thereof may be used to perform the various functions and operations described herein of a distributed-computation program. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a distributed-computation system, apparatus, and method in accordance with the present invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising:
providing, to an information feeder application program interface (API) of a personal communications device, data objects from at least one user-accessible application program of the personal communications device that assist in creating publishable content;
defining an information feed of the personal communications device, the information feed providing a collection of data objects having related information-types;
associating the data objects of the at least one program with the information feed based on the information-type of the data objects; and
receiving, via the information feeder API, the data objects of the information feed at a network component of the personal communications device, wherein the network component makes the information feed available to peers via a network.

2. The method of claim 1, wherein the network component comprises a Hypertext Transport Protocol (HTTP) server.

3. The method of claim 1, wherein the network component comprises a Session Initiation Protocol (SIP) server.

4. The method of claim 1, wherein associating the data objects with the information feed comprising registering the data objects with the information feed via an application interface associated with the information feed.

5. The method of claim 1, further comprising formatting the data objects into a data format associated with the information feed.

6. The method of claim 5, wherein formatting the data objects comprises converting a data-type of at least one of the data objects.

7. The method of claim 5, wherein formatting the data objects comprises formatting the objects into a Hypertext Markup Language (HTML) document.

8. The method of claim 1, wherein making the data objects of the information feed available via the network component of the personal communications device comprises making the data objects available via a server component of the personal communications device.

9. The method of claim 1, wherein making the data objects of the information feed available via the network component of the personal communications device further comprises sending the data objects to a server arrangement via the network.

10. The method of claim 1, wherein the personal communications device comprises a mobile terminal.

11. A processor-readable medium encoded with instructions that, when executed by a processor of a personal communications devices, perform:
receiving, via an information feeder application program interface (API), data objects from at least one user-accessible application program of the personal communications device that assist in creating publishable content;
defining an information feed of the personal communications device, the information feed providing a collection of data objects having related information-types;
associating the data objects of the at least one application program with the information feed based on information-types of the data objects; and
accessing, via the information feeder API, the data objects of the information feed by a network component of the personal communications device, wherein the network component makes the information feed available to peers via a network.

12. The processor-readable medium of claim 11, wherein the network component comprises a Hypertext Transport Protocol (HTTP) server.

13. The processor-readable medium of claim 11, wherein the network component comprises a Session Initiation Protocol (SIP) server.

14. The processor-readable medium of claim 11, wherein associating the data objects with the information feed comprising registering the data objects with the information feed via an application interface associated with the information feed.

15. A system comprising:
a network having a plurality of data consumers coupled to the network as peers; and
a personal communications device capable of being coupled to the network, wherein the personal communications device is configured as a peer of the data consumers, the personal communications device further comprising:
means for providing data objects from at least one application program of the personal communications device that assist in creating publishable content to an information feeder application program interface (API);
means for defining an information feed of the personal communications device, the information feed providing a collection of data objects having related information-types;
means for associating the data objects of the at least one application program with the information feed based on the information-types of the data objects;
means for accessing the data objects via the information feeder API to form the information feed; and
means for making the data objects of the information feed available to the data consumers via a network component of the personal communications device.

16. The system of claim 15, further comprising an aggregator node coupled to the network, the aggregator node configured to form an aggregated information feed by combining the information feed of personal communications device with information feeds received from other data processing arrangements coupled to the network.

17. The system of claim 15, wherein the personal communications device further comprises means for formatting the data objects into a data format associated with the information feed.

18. A personal communications apparatus comprising:
a processor;
a network interface configured to exchange data with one or more peers via a network; and
a memory coupled to the processor and the network interface, the memory comprising,
at least one user application configured to assist in creating publishable content in the form of data objects;
an information feeder application program interface (API) capable of receiving the data objects from the at least one user application;

an information feeder module configured to receive the data objects from the at least one user application via the information feeder (API) and form one or more information feeds based on the data objects, each information feed including a collection of data objects having related information-types;

a network interface module configured to make the information feeds available to the peers via the network interface.

19. The apparatus of claim 18, wherein the information feeder module comprises an application program interface configured accept registration of data objects and information-types associated with the data objects.

20. The apparatus of claim 18, wherein the information feeder module is further configured to format the data objects into a data format associated with the information feed.

21. The apparatus of claim 18, wherein the network interface comprises a wireless network interface.

22. The apparatus of claim 18, wherein the network module is configured to make the information feeds available via a Hypertext Transport Protocol (HTTP) server.

23. The apparatus of claim 18, wherein the network module is configured to make the information feeds available via a Session Initiation Protocol (SIP) server.

* * * * *

UNITED STATES PATENT AND TRADEMARK OFFICE
CERTIFICATE OF CORRECTION

PATENT NO.         : 7,454,461 B2                                    Page 1 of 1
APPLICATION NO. : 10/921072
DATED              : November 18, 2008
INVENTOR(S)        : Murali Krishna Punaganti Venkata It is certified that error appears in the above-identified patent and that said Letters Patent is hereby corrected as shown below:

Column 13, Claim 1, line 23: "one program" should be --one application program--.

Column 13, Claim 11, line 62: "devices" should be --device--.

Signed and Sealed this

Seventeenth Day of February, 2009

JOHN DOLL
*Acting Director of the United States Patent and Trademark Office*